United States Patent [19]
Sydendal

[11] 4,257,149
[45] Mar. 24, 1981

[54] BAND CLAMP DEVICE
[75] Inventor: Ben I. Sydendal, Burlington, Canada
[73] Assignee: Tridon Limited, Burlington, Canada
[21] Appl. No.: 967,164
[22] Filed: Dec. 7, 1978
[51] Int. Cl.³ .............................................. B65D 63/00
[52] U.S. Cl. .................................................. 24/274 R
[58] Field of Search ..................... 24/19, 20 LS, 20 R, 24/274 R, 274 P, 274 WB, 279, 280, 281, 282, 284

[56] References Cited
U.S. PATENT DOCUMENTS

| | | | |
|---|---|---|---|
| 2,571,659 | 10/1951 | Bergstrom | 24/274 R |
| 2,596,332 | 5/1952 | Flora et al. | 24/73 SA |
| 2,767,455 | 10/1956 | Schaefer | 24/274 R |
| 3,371,392 | 3/1968 | Rueckheim | 24/274 R |
| 3,398,440 | 8/1968 | Bergstrom | 24/274 R |
| 3,900,932 | 8/1975 | Allert | 24/274 R |
| 3,950,830 | 4/1976 | Duprez | 24/274 R |

Primary Examiner—Roy D. Frazier
Attorney, Agent, or Firm—Hirons, Rogers & Scott

[57] ABSTRACT

A band clamp device of the invention employs a U-shaped housing for the drive worm screw, usually formed by progressive stamping from sheet metal. The separate arms of the U embrace the band edges and the respective separate arm ends extend beneath the band. The housing can have a single ear only on one of the said separate arm ends extending through a respective cooperating slot in the band to connect the housing to the band. Usually the housing will have a single ear at each end, and the single ear adjacent the screw head end is provided on the said separate downside arm end, which is the arm end that receives the maximum force tending to spread the housing arms apart as the band is tightened about an object. It is found that such a structure is able to resist the forces tending to spread the housing arms and to separate the housing from the band, and it permits a wider ear to be used, or alternatively a narrower band for the same width ear. For greater strength the two immediately adjacent edges of the separate arm ends can be joined together, e.g., by a welding operation.

18 Claims, 5 Drawing Figures

U.S. Patent   Mar. 24, 1981   4,257,149
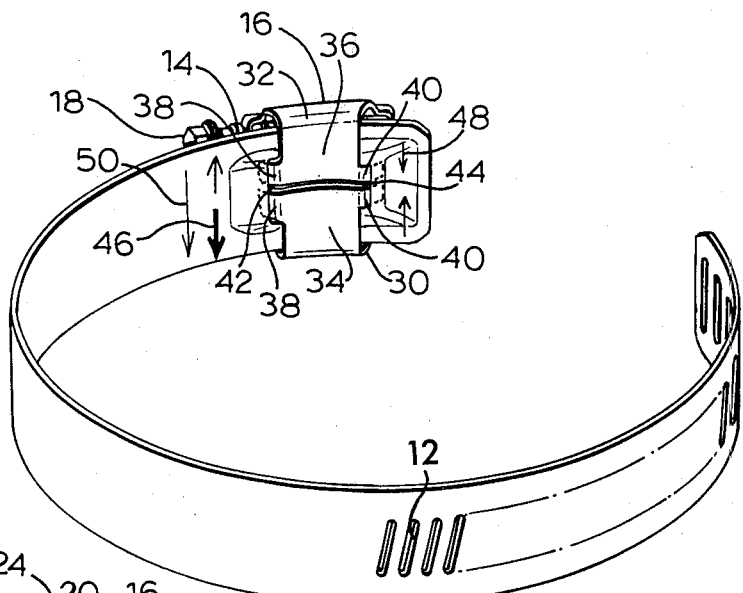
FIG.1
PRIOR ART
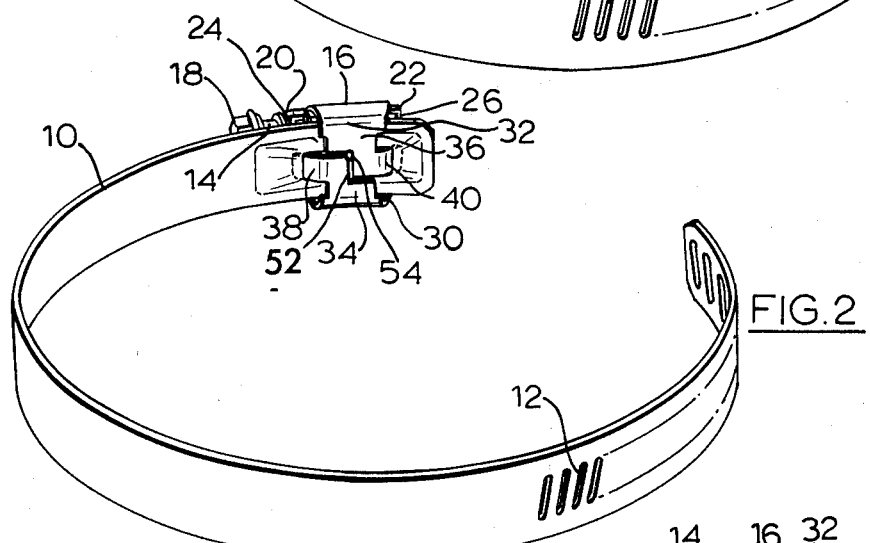
FIG.2
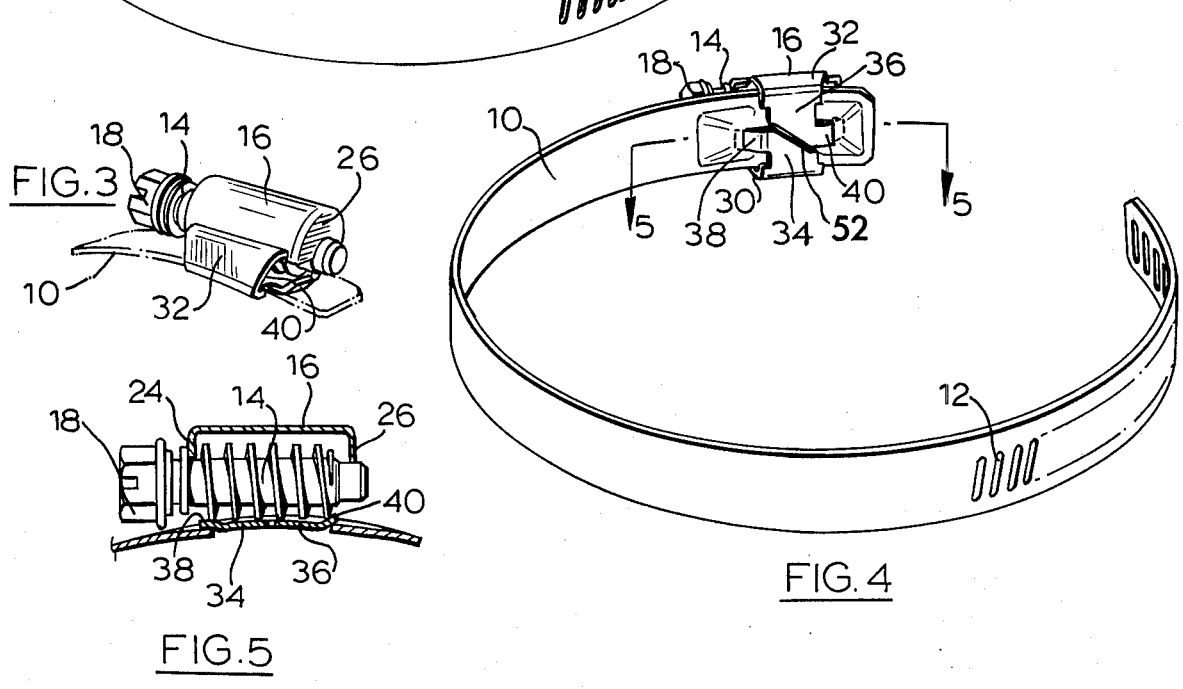
FIG.3
FIG.4
FIG.5

BAND CLAMP DEVICE

FIELD OF THE INVENTION

This invention is concerned with improvements in and relating to band clamp devices of the kind in which a worm screw member is journalled in a housing fastened to one end of a flexible metal band, the worm screw engaging transverse threads or their equivalent formed in the band to permit tightening of the band about an object, such as a hose, by rotation of the worm screw about its longitudinal axis.

DESCRIPTION OF THE PRIOR ART

It is essential for economical manufacture of band clamps that they be mass-produced on automatic machines, and it is now the most common practice to form a generally U-shaped housing by progressive stamping from thin sheet metal, the housing being fastened to the band with the worm screw interposed between them. A common fastening method is by means of integral ears on the ends of the U-shaped housing, the two ears on each end extending away from one another longitudinally of the band and at right angles to the housing side walls, and being inserted into a slot in the band; the two adjacent ears from the two sides of the housing are parallel and immediately adjacent to one another as they extend through the said transverse band slot.

A principal parameter for the performance of such clamps is the number of kilogram centimeters of clamping force that can be applied to the clamped object without failure. A major source of failure is separation of the housing from the band by the force applied thereto by the screw, either by tearing and/or twisting of the ears from the remainder of the housing, or wrenching of the ears out of the slot. These forces are due for example, to the friction between the screw and the housing bearing surfaces engaged by the screw, tending to lift the housing on one side, and by the friction between the screw and the band threads in which it is engaged, tending to force the band sideways against the housing. The effect observed is spreading apart of the housing arms that embrace the band edges and a lifting of the housing off the band. Usually it is the ears adjacent the head end of the worm screw (the head end ears) that fail, since the effect of the friction between the worm and the housing is to force these ears apart, while forcing the ears adjacent the worm tail (the tail end ears) together. These ears must therefore be made as thick and wide as possible, but this becomes difficult as the band is made narrower and there is less width of material available for the slot into which they must protrude.

In other band clamp designs the force between the band and the screw is transferred to the housing at its tail end rather than the head one, and this force may be effective to force the tail end ears apart; it is these tail end ears that must then be made as thick and wide as possible.

It is of course possible to fasten the housing to the band and/or to fasten the housing arms together, for example, by welding, but this adds to the cost of production, and at this time it is extremely difficult to provide a welding system that is applicable to such small items at the desired high rate of production by automatic machines.

Another disadvantage found as the connecting ears are made smaller is that the housing must usually be heat treated after its formation and before its mounting on the band, and such treatments can lead to a high failure rate by cracking and breaking of the ears when they are very thin and narrow. It is postulated that this results from their inherently high cooling rate relative to the remainder of the housing and problems from this source are minimized by making the ears as wide and thick as possible.

A review of the patents in the pertinent classification for band clamp devices, namely class 24, (buckles, buttons, clasps, etc) sub-class 19 (hose clamps with tighteners) revealed U.S. Pat. No. 3,398,440, issued Aug. 27, 1968 to Bergstrom, which discloses a hose clamp in which the housing is formed from seamless tube of appropriate cross section enclosing the band, so that there is no possibility of separation of the housing parts beneath the band. The housing is fastened longitudinally to the band by elongated shoulders 12 which project into the housing and engage recesses in the band.

U.S. Pat. No. 3,900,932 issued Aug. 26, 1975 to Allert, shows a hose clamp in which the housing embracing the band has its two ends beneath the band connected by a dovetail joint 30 and 31, the ends being accomodated in a recess formed in the band.

Similarly, U.S. Pat. No. 3,950,830 issued Apr. 20, 1976 to Standard Thomson Corporation describes a band clamp in which the housing arms are connected together beneath the band by means of a keyhole shaped tab 62 on one arm which fits in a correspondingly shaped notch in the other arm.

DEFINITION OF THE INVENTION

It is therefore an object of the invention to provide a new band clamp device.

It is a more specific object to provide a new band clamp device having a new structure for connecting the housing to the clamp band.

In accordance with the present invention there is provided a new band clamp device comprising:
an elongated band having transverse screw threads therein;
a U-shaped worm screw housing having a head end and a tail end mounted on one side of the band; and
a worm screw having a head end and a tail end mounted in the housing for screw-thread engagement with the said threads;
the U-shaped housing having downside and upside arms embracing respective edges of the band, and having corresponding separate downside and upside arm ends extending parallel to the other side of the band;
the housing having only a single longitudinally-extending downside ear provided on the said separate downside arm end without an adjacent longitudinally-extending upside ear on the said separate upside arm, the said single downside ear-extending through a respective cooperating transverse slot in the band to retain the housing on the band; and
the housing having at least one longitudinally-extending upside ear provided on the said separate upside arm end also extending through a respective cooperating transverse slot in the band, also to retain the housing on the band.

Also in accordance with the present invention there is provided a new band clamp device comprising:
an elongated band having transverse screw threads therein;

a U-shaped worm drive screw housing having a head end and a tail end mounted on one side of the band; and a worm drive screw having a head and a tail end mounted in the housing for screw-thread engagement with the said threads;

the U-shaped housing having downside and upside arms embracing respective edges of the band, and having corresponding separate downside and upside arm ends extending parallel to the other side of the band; and the housing having only a single longitudinally-extending downside ear provided on the said separate downside arm end without an adjacent longitudinally-extending upside ear on the said separate upside arm, the said single downside ear-extending through a respective cooperating transverse slot in the band for retention of the housing on the band.

DESCRIPTION OF THE DRAWINGS

Band clamp devices which are particular preferred embodiments of the invention will now be described, by way of example, with reference to the accompanying diagrammatic drawings, wherein:

FIG. 1, is a perspective view of a prior art band clamp device, showing the underside of the housing to illustrate the manner in which the housing is fixed to the band, FIG. 2, is a similar view of a device which is a first embodiment of the invention to illustrate the new manner in which the housing is fixed to the band, FIG. 3 is a perspective view of the upperside of the housing of the device of FIG. 2, FIG. 4 is a view similar to FIG. 2 of another embodiment of the invention, and FIG. 5 is a section taken on the line 5—5 of FIG. 4.

The same reference number is used for similar parts in all of the figures of the drawings.

DESCRIPTION OF THE PREFERRED EMBODIMENTS

Reference will now be made to FIG. 1, illustrating a prior art device, although reference may also be made to FIGS. 3 and 5 to assist in understanding of the description. The device of FIG. 1 consists of the usual elongated metal band 10 having inclined screw-thread slots 12 therein, these slots being engaged by a rotatable worm screw member 14 mounted in a U-shaped housing 16 fastened to the band adjacent one end thereof. The screw threads are illustrated as slots but can of course be provided by formed grooves, or any equivalent structure, as is well known to those skilled in the art. The worm screw has a head 18 by which it is rotated, and head and tail bearing surfaces 20 and 22 (FIG. 2) respectively which engage with the edges of respective bearing apertures in the corresponding end walls 24 and 26 of the housing, so that the screw is supported in the housing for rotation about its longitudinal axis.

The U-shaped housing is formed by progressive stamping from thin sheet metal and is mounted on the band with its semicircular portion embracing the screw worm, while the arms 30 and 32 are shaped to embrace the edges of the band. The respective ends 34 and 36 of the arms 30 and 32 extend toward one another beneath the band until they meet or nearly meet. The arms ends 34 and 36 are each provided with two oppositely-longitudinally-extending ears 38 and 40 which extend through a slot in the band having respective transverse edges 42 and 44 to retain the housing on the band. For convenience in terminology the two ears 38 at the head end of the housing will be called the head end ears, while the other two ears will be called the tail end ears.

As the clamp is tightened about an object the effect of the friction between the screw worm and the housing surface 20 which it engages is to apply a torque to the housing that urges the housing to rotate with the screw. Simultaneously there is a high friction force between the lands of the screw and the edges of the slots in which they are engaged, these friction forces urging the band sideways in the housing against the inner wall thereof. The result of these forces is to urge the two head end ears 38 apart, while forcing the two tail end ears 40 together, as indicated by the respective arrows 46 and 48. It is for this reason that, as illustrated, in these prior art devices, the ears 40 can be quite narrow, but the ears 38 are made as wide as possible, since their thickness is limited by the need for production from uniform thickness sheet material. The presence of the slot into which the ears protrude results in a weakness in the band, and the maximum permissible width of this slot places a limit on the maximum possible width of the screw end ears. The spreading forces applied to the ears 38 are not equal and opposite, but a much greater force is applied to the ear that is "downside" of the direction of the forces applied upon tightening rotation of the worm screw 14, which conventionally is clockwise. This force direction is indicated by the arrow 50 and the corresponding arrow 46 in the same direction is thicker to illustrate that it represents a larger force than the other arrow.

Turning now to FIG. 2, which illustrates a band clamp that is a first embodiment of the invention, it will be seen that only a single head end ear 38 is provided engaged in a slot of corresponding width, this ear being on the housing arm end 34 that, using the terminology above, is referred to as the "downside" arm end thereof. A single tail end ear 40 of the same width as the head end ear 38 is provided on the opposite "upside" housing arm end protruding into the slot. There is no extending upside ear on the upside arm end adjacent to the downside ear 38. The adjacent facing edges 52 of the two arm ends are formed with matching jogs at about their centres, so that as much metal as possible is available at the roots of the respective ears where they join their respective arm ends. Since only a single head end ear is provided it can of course be made substantially wider than in the prior art construction, or conversely the band 10 can be made narrower without the slot therein for reception of the ears causing too much weakening thereof.

The single tail end ear is in this embodiment made as wide as the head end ear, so that it is as stiff as possible, since it must resist the other upside head end force transmitted through the respective housing arm end 36. It is found from actual construction that as long as the single ear is adequate to resist the downside head end force, then the single ear 40 together with the housing arm end 36 are of adequate strength to resist the said upside head end force transmitted through the arm end 36. If a heavier duty band clamp device is required the housing can be made much more rigid by joining the two arm ends together at their junction, for example by means of a weld 54. The additional cost of this joining operation can often be justified because of the savings in material and the ability to utilize such an unexpectedly narrow band.

The embodiment of FIG. 4 is functionally similar to that of FIG. 2, but the adjacent facing edges 52 of the arm ends are inclined to be complementary to one another and not jogged. Such a construction has the advantage that the edges can always be pressed firmly together for a joining operation despite differences in dimensions of the housing due to manufacturing tolerances, since any such discrepancies either of over-size or under-size can be compensated by relative longitudinal movement of the two arm ends, until the desired contact is achieved.

In the band clamp constructions illustrated the head end of the housing receives the spreading force, but in other constructions it may be the tail arm end that receives the force, and the single ear provided at the housing tail arm end will therefore be provided on the respective downside arm end. It will be seen by those skilled in the art that the benefit of the invention is obtained in a band clamp device construction in which two ears are still provided on the arm ends which receive a force urging them together, although the structures described as particular preferred embodiments are to be preferred.

Again, the benefit of the invention is obtained in which one end only of the housing is provided with an arm end ear for engagement in a transverse slot in the band to retain that end of the housing on the band, the other end not being connected to the band, or being connected by some other fastening means, such as by welding. The single ear provided at the arm end is of maximum width for the width of band employed, and other problems encountered with thin narrow ears, such as excessive cracking upon heat treatment, are avoided. In such constructions the housing may need to be made of thicker sheet material to provide the necessary rigidity at the upside arm end in the absence of an ear retaining that end directly on the band.

A further advantage of the structures of the invention is that a single fastening, such as the weld 54, is adequate to provide the necessary connection between the two arms, when such a connection is to be provided, whereas a structure using these narrow ears would require a line weld extending the length of the housing and overlying the ears. A single central weld of this kind is much easier and less expensive to provide than a line weld. The possibility of welding the housing before its mounting on the band, and ready assembly by use of the ears, is desirable so that the housing can be plated or otherwise anti-corrosion treated without having to include the band in such treatment.

I claim:

1. A band clamp device comprising:
   an elongated band having transverse screw threads therein;
   a U-shaped worm drive screw housing having a head end and a tail end mounted on one side of the band; and
   a worm drive screw having a head end and a tail end mounted in the housing for screw-thread engagement with the said threads;
   the U-shaped housing having downside and upside arms embracing respective edges of the hand, and having corresponding separate downside and upside arm ends extending parallel to the other side of the band;
   the housing having only a single longitudinally-extending downside ear provided on the said separate downside arm without an adjacent longitudinally-extending upside ear on the said separate upside arm, the said single downside ear extending through a respective cooperating transverse slot in the band to retain the housing on the band; and
   the housing having at least one longitudinally-extending upside ear provided on the said separate upside arm end also extending through a respective cooperating transverse slot in the band, also to retain the housing on the band.

2. A band clamp device as claimed in claim 1, wherein the housing has only a single ear provided on said separate upside arm end.

3. A band clamp device as claimed in claim 1, wherein said downside arm and the ear thereon are disposed at the head end of the said housing.

4. A band clamp device as claimed in claim 3, wherein the housing has only a single ear provided on said separate upside arm end.

5. A band clamp as claimed in claim 1, wherein the immediately adjacent separate edges of the arm ends are joined to one another.

6. A band clamp as claimed in claim 1, wherein the immediately adjacent separate edges of the arm ends are provided with complementary jogs so that the edges fit together over their length.

7. A band clamp as claimed in claim 6, wherein the immediately adjacent separate edges of the arm ends are joined to one another.

8. A band clamp as claimed in claim 1, wherein the immediately adjacent separate edges of the arm ends are inclined oppositely to one another so that the edges fit together over their length.

9. A band clamp as claimed in claim 8, wherein the immediately adjacent separate edges of the arm ends are joined to one another.

10. A band clamp as claimed in claim 1, wherein the said downside ear and the upside ear are of the same width.

11. A band clamp device comprising:
    an elongated band having transverse screw threads therein;
    a U-shaped worm drive screw housing having a head end and a tail end mounted on one side of the band; and
    a worm drive screw having a head and a tail end mounted in the housing for screw-thread engagement with the said threads;
    the U-shaped housing having downside and upside arms embracing respective edges of the band, and having corresponding separate downside and upside arm ends extending parallel to the other side of the band;
    the housing having only a single longitudinally-extending downside ear provided on the said separate downside arm end without an adjacent longitudinally-extending upside ear on the said separate upside arm, the said single downside ear extending through a respective cooperating transverse slot in the band to retain the housing on the band.

12. A band clamp device as claimed in claim 11, wherein the said single ear is the head end ear of the housing.

13. A band clamp as claimed in claim 11, wherein the immediately adjacent separate edges of the arm ends are joined to one another.

14. A band clamp as claimed in claim 11, wherein the immediately adjacent separate edges of the arm ends are provided with complementary jogs so that the edges fit together over their length.

15. A band clamp as claimed in claim 14, wherein the immediately adjacent separate edges of the arm ends are joined to one another.

16. A band clamp as claimed in claim 11, wherein the immediately adjacent separate edges of the arm ends are inclined to one another so that the edges fit together over their length.

17. A band clamp as claimed in claim 16, wherein the immediately adjacent separate edges of the arm ends are joined to one another.

18. A band clamp as claimed in claim 11, wherein the said downside ear retains the respective end of the housing on the band and there are provided means on the housing for retaining the other end thereof on the band.

* * * * *